United States Patent
Korenwaitz et al.

(10) Patent No.: US 12,327,390 B2
(45) Date of Patent: Jun. 10, 2025

(54) REAL TIME LOCAL FILTERING OF ON-SCREEN IMAGES

(71) Applicant: NETSPARK LTD., Giva't Shmu'el (IL)

(72) Inventors: Elyasaf Korenwaitz, Elon-More (IL); Ariel Yosef, Rehovot (IL); Zvi Bazak, Jerusalem (IL)

(*) Notice: Subject to any disclaimer, the term of this patent is extended or adjusted under 35 U.S.C. 154(b) by 443 days.

(21) Appl. No.: 17/922,367

(22) PCT Filed: May 10, 2021

(86) PCT No.: PCT/IL2021/050527
§ 371 (c)(1),
(2) Date: Oct. 30, 2022

(87) PCT Pub. No.: WO2021/255718
PCT Pub. Date: Dec. 23, 2021

(65) Prior Publication Data
US 2023/0177805 A1   Jun. 8, 2023

Related U.S. Application Data

(60) Provisional application No. 63/038,918, filed on Jun. 15, 2020.

(51) Int. Cl.
*G06V 10/00* (2022.01)
*G06V 10/20* (2022.01)
*G06V 10/72* (2022.01)

(52) U.S. Cl.
CPC ............ *G06V 10/72* (2022.01); *G06V 10/20* (2022.01)

(58) Field of Classification Search
CPC ........... G06N 3/02; G06N 3/08; G06N 3/042; G06N 3/045; G06N 3/047; G06N 3/082;
(Continued)

(56) References Cited

U.S. PATENT DOCUMENTS 6,065,056 A   5/2000   Bradshaw et al.
7,046,139 B2  5/2006   Kuhn et al.
(Continued)

FOREIGN PATENT DOCUMENTS

WO   2010022185 A1   2/2010

OTHER PUBLICATIONS

Xukan Ran, Haoliang Chen, Zhenming Liu, and Jiasi Chen. 2017. Delivering Deep Learning to Mobile Devices via Offloading. In Proceedings of VR/AR Network '17, Los Angeles, CA, USA, Aug. 25, 2017, 6 pages. https://doi.org/10.1145/3097895.3097903.

*Primary Examiner* — Amir Alavi (57) ABSTRACT

The present invention in some embodiments thereof relates to a system and method for detecting inappropriate content on a device and filtering content on a variety of media. Inappropriate content is detected by taking a sample of media from at least one of a local memory, a data stream from a network and a data stream from local sensor, pre-processing the sample using a local processor and locally stored software to determine if the sample is a likely candidate to include objectionable content, in response to said sample being found to be a likely candidate perform at least one of quarantining the sample, marking the media, sending the sample to a remote processor for further analysis, analyzing the sample using an artificial intelligence routine running on a local processor and analyzing the sample using an artificial intelligence routine running on said local processor.

22 Claims, 5 Drawing Sheets

(58) Field of Classification Search
CPC .... G06N 3/092; G06N 3/0454; G06N 3/0475; G06N 3/0464; G06V 10/20; G06V 10/82; G06V 10/72; H04N 21/6582; H04N 21/23418; G04N 21/42203; G04N 21/4223; G04N 21/4394; G04N 21/44008; G04N 21/4542; G04N 21/4882; G04N 21/6543

See application file for complete search history.

(56) References Cited

U.S. PATENT DOCUMENTS

| | | | |
|---|---|---|---|
| 7,996,005 B2 | 8/2011 | Lotter et al. | |
| 8,108,923 B1 | 1/2012 | Satish et al. | |
| 8,285,118 B2 | 10/2012 | Bronstein et al. | |
| 8,701,137 B2 | 4/2014 | Katpelly et al. | |
| 8,725,746 B2 | 5/2014 | Yang et al. | |
| 8,826,322 B2 | 9/2014 | Bliss et al. | |
| 8,984,581 B2 | 3/2015 | Luna et al. | |
| 9,330,274 B2 | 5/2016 | Schepis et al. | |
| 9,762,462 B2 | 9/2017 | Cherifi et al. | |
| 10,827,023 B1* | 11/2020 | Yan | H04L 67/535 |
| 10,878,246 B1* | 12/2020 | Vijayrao | H04L 63/0245 |
| 11,093,711 B2* | 8/2021 | Iida | G06F 18/23213 |
| 11,398,999 B1* | 7/2022 | Shrestha | G08B 21/0269 |
| 11,442,985 B2* | 9/2022 | Aksu | G06F 16/75 |
| 11,616,819 B2* | 3/2023 | Jarman | H04N 21/25891 |
| | | | 715/202 |
| 11,736,769 B2* | 8/2023 | Khov | G06V 20/41 |
| | | | 725/28 |
| 12,081,552 B2* | 9/2024 | Mitchell | G06F 21/629 |
| 12,198,030 B1* | 1/2025 | Mysore | G06F 11/3684 |
| 12,199,931 B2* | 1/2025 | Palazzo | H04L 51/046 |
| 2006/0177198 A1 | 8/2006 | Jarman et al. | |
| 2008/0270233 A1 | 10/2008 | Yip et al. | |
| 2009/0087015 A1 | 4/2009 | Nierzwick et al. | |
| 2009/0288131 A1 | 11/2009 | Kandekar et al. | |
| 2010/0022185 A1 | 1/2010 | Fruit et al. | |
| 2015/0070516 A1 | 3/2015 | Shoemake et al. | |
| 2017/0061248 A1 | 3/2017 | Ryan, Jr. et al. | |
| 2017/0289624 A1 | 10/2017 | Avila et al. | |
| 2025/0080511 A1* | 3/2025 | Ogawa | G06V 30/19 |

* cited by examiner

REAL TIME LOCAL FILTERING OF ON-SCREEN IMAGES

RELATED APPLICATION/S

This application claims the benefit of priority under 35 USC § 119(c) of U.S. Provisional Patent Application No. 63/038,918 filed 15 Jun. 2020, the contents of which are incorporated herein by reference in their entirety.

FIELD AND BACKGROUND OF THE INVENTION

The present invention, in some embodiments thereof, relates to system and method for detecting inappropriate content on a device and, more particularly, but not exclusively, filtering content on a variety of media and/or device.

International Patent Publication no. WO2010022185 appears to disclose that, "Mobile phones and other portable devices are equipped with a variety of technologies by which existing functionality can be improved, and new functionality can be provided. Some aspects relate to visual search capabilities, and determining appropriate actions responsive to different image inputs. Others relate to processing of image data. Still others concern metadata generation, processing, and representation. Yet others concern user interface improvements. Other aspects relate to imaging architectures, in which a mobile phone's image sensor is one in a chain of stages that successively act on packetized instructions/data, to capture and later process imagery. Still other aspects relate to distribution of processing tasks between the mobile device and remote resources ("the cloud"). Elemental image processing (e.g., simple filtering and edge detection) can be performed on the mobile phone, while other operations can be referred out to remote service providers. The remote service providers can be selected using techniques such as reverse auctions, through which they compete for processing tasks. A great number of other features and arrangements are also detailed."

U.S. Pat. No. 8,701,137 appears to disclose, "Systems and methods . . . for enabling an administrator to monitor and control usage of media content in a locale. In one embodiment, the locale includes one or more media devices that have access to media content from one or more local and/or remote content sources. Usage data defining usage of the media content by a user is obtained. A pattern including two or more media segments consumed by the user is detected based on the usage data and one or more predefined pattern detection rules. The administrator is then enabled to review the pattern and choose whether to block usage. Usage of at least one of the media segments included in the pattern is then blocked at the one or more media devices at the locale in response to the administrator choosing to block usage of the at least one of the media segments included in the pattern."

U.S. Pat. No. 8,108,923 appears to disclose, (in the language of that disclosure) "Controlling access to a protected network . . . . In some embodiments, one or more events that occur will a host is disconnected from the protected network are logged. The log is provided to one or more devices associated with the protected network when the host requests access to the protected network after a period in which it was not connected. In some embodiments, a network access control or other device or process uses the log to determine whether and/or an extent to which the host should be permitted to connect to the network."

US Patent Publication no. 20080270233 appears to disclose, "Architecture that leverages enabling technologies for tracking offline activity of a user, and rating performance of offline/online publishers of content and/or advertisements. Knowledge about user offline interests can be accumulated and used to target the user with smart advertisements when offline or online. Moreover, the performance of publishers of the offline content computed by merchants who contract with publishers to provide the best exposure. In support thereof, rate information in the form of response rate and conversion rate can be computed and analyzed for each offline publisher. A publisher referral ID for a publisher is inserted into detectable indicia associated with offline media such as print media, audio media, video media, etc. When a user interacts with the offline content using a cell phone, the captured information is forwarded to an online advertisement component framework for responding to the user interaction (e.g., a purchase transaction or request for further information)."

U.S. Pat. No. 9,762,462 appears to disclose, "An approach . . . for an anti-bullying service. A service platform monitors interaction data from one or more applications, wherein the interaction data is associated with an interaction between a source and a target. The service platform analyzes the interaction data to parse one or more indicators of a monitored conduct between the source and the target. The service platform then initiates at least one of (a) a recording of the interaction data; (b) a transmission of an alert message, the one or more indicators, the interaction data, the monitored conduct, or a combination thereof to a third party; and (c) a pushing of an anti-conduct application to a source device associated with the source, a target device associated with the target, or a combination thereof based on the monitored conduct, the one or more indicators, or a combination thereof."

US Patent Publication no. 20090288131 appears to disclose, "Systems and methods . . . for providing advance content alerts during playback of a media item. In one embodiment, the advance content alerts are provided to a mobile device, such as a mobile telephone, of an associated user. More specifically, a user registers his or her mobile device with a media player and configures the types of content for which the user would like to receive advance content alerts. Thereafter, during playback of a media item, the media player identifies upcoming content for which the user desires an advance content alert. In response, the media player generates an advance content alert and sends the advance content alert to the mobile device of the user via, for example, a local wireless communication link."

U.S. Pat. No. 8,725,746 appears to disclose that, "A method for filtering user information takes into account not only specific keywords in the user information, but also related user-characteristic data (e.g., user activity data), and allows targeted user characteristics to be determined from multiple aspects of user activities. In one aspect, the disclosed method adopts different filtering schemes for different types of targeted users to improve the recognition accuracy with respect to the target user information. The method determines a suitable filtering scheme using a correspondence relationship between the filtering scheme and keywords and user-characteristic data. The method uses modeling of sample users and multiple candidate filtering schemes to formulate targeted filtering scheme. An apparatus for implementing the method is also disclosed."

Additional background art includes U.S. Pat. Nos. 8,984,581, 7,046,139, 984,581, 8,285,118, US Patent Publication no. 20170289624, U.S. Pat. Nos. 8,826,322, 8,984,581, 6,065,056, US Patent Publication no. 20170061248, US Patent Publication no. 20090087015, U.S. Pat. No. 7,996,005, US Patent Publication no. 20060177198, U.S. Pat. No. 9,330,274

SUMMARY OF THE INVENTION

According to an aspect of some embodiments of the invention, there is provided a method of local content filtering for a device including: taking a sample of media from at least one of a local memory, a data stream from a network and a data stream from local sensor; preprocessing the sample using a local processor and locally stored software to determine if the sample is a likely candidate to include objectionable content; in response to the sample being found to be a likely candidate perform at least one of quarantining the sample, marking the media, sending the sample to a remote processor for further analysis, analyzing the sample using an artificial intelligence routine running on a local processor and analyzing the sample using an artificial intelligence routine running on the local processor.

According to some embodiments of the invention, the marking includes computing a hash value.

According to some embodiments of the invention, the preprocessing is performed by a dedicated processor.

According to some embodiments of the invention, the dedicated processor includes at least one of an ASIC (Application Specific Integrated Circuit), FPGA (Field-programmable gate arrays) or SoC (System-on-a-Chip).

According to some embodiments of the invention, the preprocessing is performed by a processor native to a Network Interface Card (NIC).

According to some embodiments of the invention, the preprocessing is performed by a processor native to a memory controller.

According to some embodiments of the invention, the taking a sample is in real time between a time the media is accessed and a time the media is rendered.

According to some embodiments of the invention, the method further includes checking a resource availability on the device and performing the analyzing when there are at least a minimum free resource and not performing the analyzing when there are less than the minimum free resources.

According to some embodiments of the invention, the preprocessing includes at least one of white balance correction, a gamma correction, an edge enhancement, image resolution adjustment, an FFT, edge detection, pattern extraction, texture classification, a color histogram, motion detection, feature recognition, entropy measuring, signature detection and skin tone recognition.

According to some embodiments of the invention, the method further includes sending a content item to an external server for further processing when the analyzing produces ambiguous results.

According to some embodiments of the invention, the method further includes sending a content item to an external server when the content is determined to be objectionable.

According to some embodiments of the invention, the analyzing is performed on a part of the content and wherein another device performs analyzing on another portion of the content.

According to some embodiments of the invention, the preprocessing and the analyzing are performed by an application running on under an operating system Android, windows, IOS or other.

According to some embodiments of the invention, the preprocessing routines are pretrained.

According to some embodiments of the invention, the sampler includes instructions to sample content more heavily based on active or background applications, regions of a display, regions of storage, type of application or source of the content, particularly social networks, search results, instant messaging and entertainment media.

According to some embodiments of the invention, the software includes a hash function or signatures for identifying previously recognized undesirable content.

According to some embodiments of the invention, the software includes a hash function or signatures for generating signatures for recognition of newly recognized undesirable content.

According to some embodiments of the invention, the user data includes personalized instructions that define how strictly to sample and analyze content, how many resources to use in the analysis, and how to act when objectionable content is identified.

According to an aspect of some embodiments of the invention, there is provided a system for local content filtering for a device including: taking a sample of media from at least one of a local memory, a data stream from a network and a data stream from local sensor; preprocessing the sample using a local processor and locally stored software to determine if the sample is a likely candidate to include objectionable content; in response to the sample being found to be a likely candidate perform at least one of quarantining the sample, marking the media, sending the sample to a remote processor for further analysis, analyzing the sample using an artificial intelligence routine running on a local processor and analyzing the sample using an artificial intelligence routine running on the local processor.

According to some embodiments of the invention, the system is a self-contained application or exists as an add-on to an existing application.

According to some embodiments of the invention, the application is self-updating when new content is detected or updates of the application are including with updates of the device or the existing application.

According to some embodiments of the invention, the preprocessing includes prefiltering that uses low computational cost methodologies to eliminate images with a low likelihood of undesirable content.

According to some embodiments of the invention, the preprocessing uses meta data to set a sampling rate and/or low resource prefilter.

According to some embodiments of the invention, the preprocessing is performed using at least one of an ASIC (Application Specific Integrated Circuit), FPGA (Field-programmable gate arrays) or SoC (System-on-a-Chip).

According to some embodiments of the invention, the preprocessing is performed by a processor native to a Network Interface Card (NIC).

According to some embodiments of the invention, the preprocessing is performed by a processor native to a memory controller.

According to some embodiments of the invention, the taking a sample is in real time between a time the media is accessed and a time the media is rendered.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) and/or a mesh network (meshnet, emesh) and/or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g., the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Overview

The present invention, in some embodiments thereof, relates to system and method for detecting content on a device and, more particularly, but not exclusively, filtering inappropriate content on a variety of media.

An aspect of some embodiments of the current invention relates to filtering of images and/or data using local resources of a computing device (e.g., a cell phone, a smart TV's, Internet of Things (IoT) devices, a component of a large system [for example a smart interface (e.g., a smart Network Interface Card, a smart camera interface)]). In some embodiments, the filtering is performed locally on a device will relatively low computing power. Optionally, the filtering may be in real time (e.g. incoming data may be filtered before it is rendered and/or before it is supplied to a calling application). In some embodiments, a local processor samples images and/or data and/or flags potentially undesirable content. For example, the system includes a prefilter that uses low computational cost methodologies to eliminate images with a low likelihood of undesirable content. In some embodiments, a pretrained artificial intelligence routine (for example using a Convolutional Neural Network CNN) is used to detect undesired image content using local resources. For example, this may save significant power on a low powered device (e.g. a cellphone running on battery) and/or a device having any operating system for example an Android operating system and/or this may allow monitoring a large amount of traffic without requiring transferring data between portions of the device.

Specific Embodiments

There has been a great deal of interest in supervision of use of mobile devices, protecting privacy and/or preventing various kinds of data abuse (e.g., cyberbullying, cyber harassment, cyber surveillance). Interest comes from various directions, including but not limited to parents trying to protect their children and/or content providers trying to protect their intellectual property from unapproved distribution and/or corporations trying to protect their intellectual property from industrial espionage and/or police trying to detect or prevent organized crime and terrorism and/or governments trying to detect and prevent spying. Many content filtering systems use an external server to monitor and/or control data transmitted to and/or from a device over a network. The use of a network server for content filtering has some significant disadvantages. Use of a network server to filter content may entail a great deal of computing power on a dedicated server. Another issue may be access to data. For example, data may be transferred in an encrypted form, and/or analysis of content of encrypted data may entail a decryption stage on the local machine which presents problems for server access. Another potential problem is that many mobile devices have multiple ports that can receive and/or transmit data without the data passing through the network and/or the supervising network server. Monitoring such data from an external server would require the server to control local ports of the device and/or send data passing through the local port to the external server for analysis. Such external oversight may be cumbersome and/or unfeasible for various reasons. For example, a network server may not be able to monitor data that is transferred and/or viewed while the device is off-line. For example, monitoring non-network content with an external server may result in sending large quantities of local data to an external server for analysis. The increased use of network bandwidth and battery power from data transmissions may be prohibitively expensive in terms of resource use, time and/or inconvenience for a device user. Similar problems may occur in a complex device, wherein monitoring a large quantity of data may make unreasonable demands on an internal data bus and/or short term data storage and/or computational power. In some embodiments, the current invention relates to a method and/or a system by which potentially undesirable content may be recognized and/or removed at a local level (e.g. without wasting precious general resources of a device and/or network). In some embodiments, local content filtering (whether within a single device and/or within a single component of a complex device) may reduce data transfer and/or data redundancy and/or overhead within a device and/or between devices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
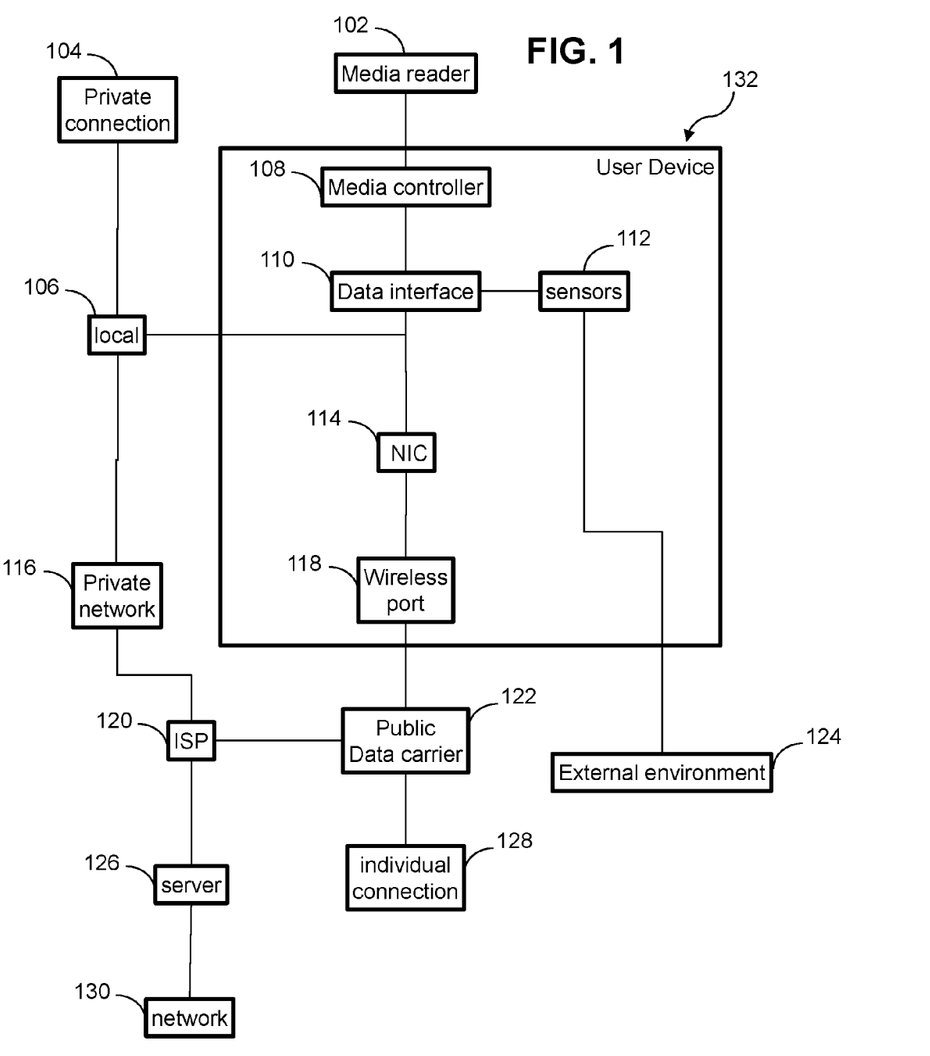
FIG. 1 is an illustration of data ports of mobile user device.

FIG. 1 is an illustration of data ports of mobile user device 132 in accordance with an embodiment of the current invention. In some embodiments, a content filtering application may run on local resources and/or protect a user and/or a network from content arriving from entry ports of different types and/or from data from various sources.

In accordance with some embodiments, content filtering is broken into separable tasks. Optionally, initial screening may be carried out by low power components. Content requiring more detailed analysis may be sent to an external processor. For example, some analysis may be performed using parallel hardware within a device 132 (for example, a dedicated processor for example an ASIC (Application Specific Integrated Circuit), FPGA (Field-programmable gate arrays) or SoC (System-on-a-Chip). For example, the parallel hardware may be contained in a smart network interface (for example a smart Network Interface Card (NIC) 114) and/or in a data interface 110 and/or a media controller 108.

In some embodiments, data being received from and/or sent to an external and/or internal data source may be scanned in real time. For example, when data is accessed on a data storage device the data may be scanned before being allowed to active process. In some embodiments, media files may be sampled rather than scanned in entirety. Alternatively or additionally, after being scanned (e.g., in real time upon access and/or in background scanning) may be marked with a hash tag. Optionally, when a user and/or application later calls up the file, the hashtag may be checked and if the file has not been changed it may be supplied to the routine without further processing. In some embodiments, a video and/or video stream may be broken into a key frames and/or a sample of the key frames may be checked for undesirable content before rendering.

In some embodiments, local memory and/or samples of data accessed remotely may be scanned off-line. For example, a program may sample and test local memory when there are available local resources (for example, a local processor and/or a battery). For example, media files may be checked for undesirable content. For example, a catch of a browser and/or a social network and/or an instant messenger may be checked. In some embodiments, a live feed from a camera may be sampled and/or stored locally for scanning off-line. For example, scanning may be performed when there are free resources. Files that have suspicious content may be marked for follow up, for example being sent to an external scanner (e.g. a network server) and/or being scanned using a more complex module when there are more resources available. Optionally, such items may be temporarily quarantined until their status is verified. Alternatively or additionally, suspicious content may be accessible until its final status has been determined.

In some embodiments, the device 132 may include a wireless port 118 connected to a public data carrier 122 (for example a cellular network). The public data carrier 122 may give access to individual connections 128 (for example phone connections and/or SMS messaging). The public data carrier 122 may also give access to networks such as the Internet 120 and/or various networks that work over the Internet. For example, communication over the Internet may be over an Internet Service Provider (ISP) 120. In some embodiments, a server 126 and/or private network 130 may intervene to control access to some networks (e.g. the Internet).

In some embodiments, the device 132 may include a private port 106 (e.g. a hard-wired connector and/or a short-range wireless port [e.g. Bluetooth and/or infra-red (IR) port and/or a near field connector (NFC)]). In some embodiments, a local scanning system will monitor data entering or leaving such a port. This may be important, for example, when peer to peer data transfers over such ad hoc connections allow access to data that is not protected by a commercial server and/or when the device 132 does not have access to network resources. Optionally, a local scanning routine secures data and/or scans media received from and/or sent across a private port. In some cases, the local resources may only give a coarse differentiation between desirable and undesirable content. Local rules may be used to determine a threshold of danger which triggers actions such as quarantining data (for example until more resources are available for a more decisive scan) and/or cut off communication and/or alert a user.

In some embodiments, a device 132 may include a sensor 112 (for example a camera and/or a microphone) that collects data from the environment 124. In some cases, these resources may be exploited by unfriendly parties and/or may be used for improper purposes. Optionally a scanner will track incoming data (e.g. images from a camera). When suspicious activity is detected the system may take action to protect a user or others. Alternatively or additionally, a scanning program may work in background scanning media captured with sensors for suspicious and/or improper materials. These actions may be performed locally, for example, without requiring a large amount of battery and/or bandwidth transferring a large amount of data to a server 126.

In some embodiments, private data from a private connection 104, a media reader 102, an individual connection 128 and/or a sensor 112 may allow the device 132 to receive and/or export data in a manner that bypasses a server 126. Optionally, a local program may monitor such data. For example, the local monitoring program may send data to the server 126 for content analysis and/or filtering. Sending such local data to a server may be expensive in terms of resources. For example, sending data to the server may use up bandwidth and/or battery power (for example, when the data is transmitted over a cellular network 116 to the server). Alternatively or additionally, data from private data sources may be analyzed locally. In some cases, (for example, where data is generated fast for example, when user makes a video and/or inserts a removable media into a reader) a large quantity of data may be generated quickly and/or present a serious challenge to local resources for analysis. In some embodiments, a local content scanning application may scan data as it is accessed. For example, the application may sample and/or scan images from a display of the device 132 and/or images that are accessed by another application. For example, the application may sample sounds played to a user and/or sound files that are accessed by another application.

In some embodiments, a device 132 may include a media reader 102. Optionally, a removable media such as a memory card may be read by the media reader allowing access and/or allowing collecting of large quantities of data quickly. In some embodiments, a pre-processing step will be performed on a large sample of the data, marking safe data and/or suspect data. For example, when a large quantity of data is made available simultaneously, a quick partial analysis will be made of a large number of media files. Then as data is accessed, the system will be able to access safe areas without delay and/or concentrate resources on clearing up the status of suspicious areas.

Figure 2:
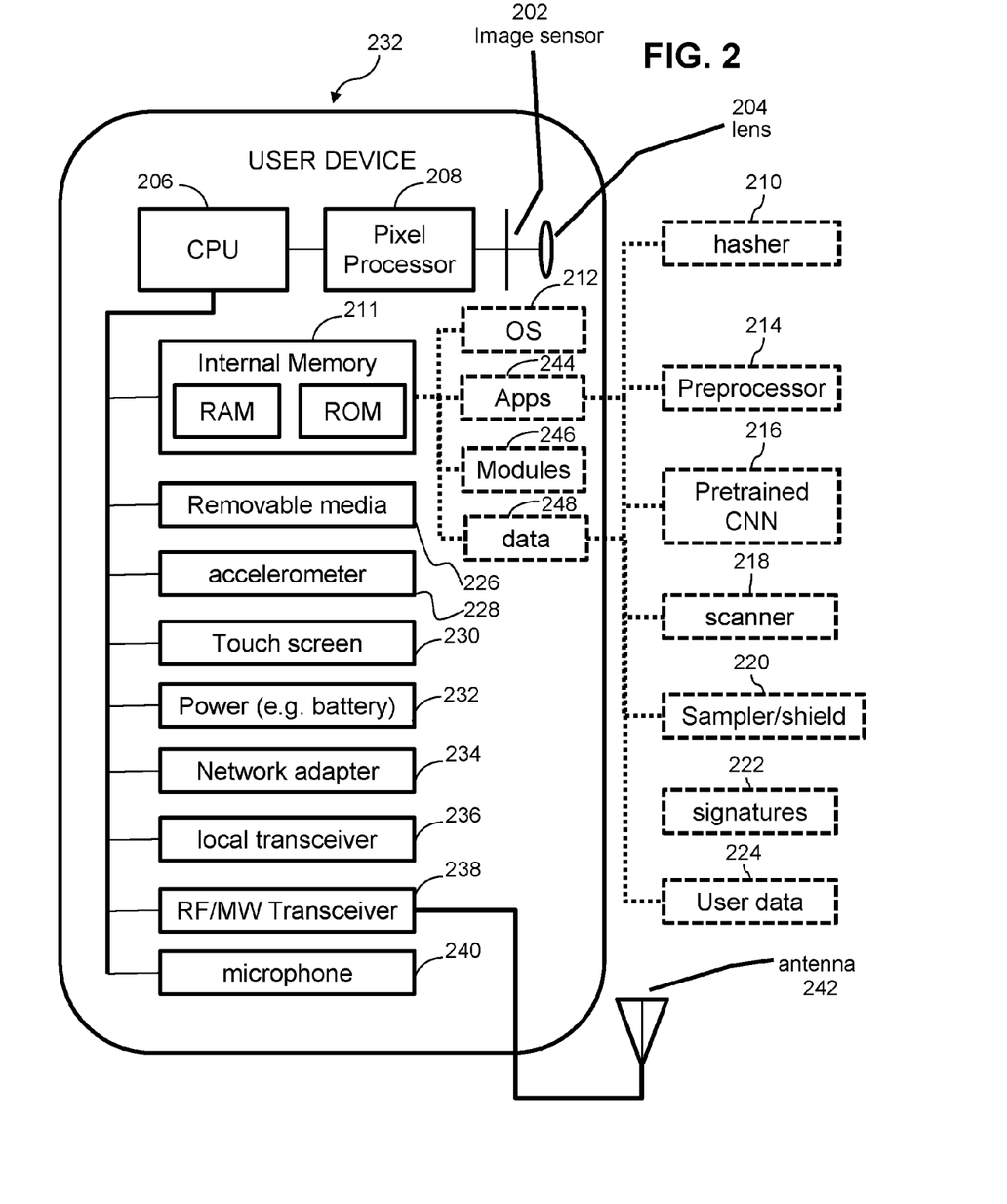
FIG. 2 is an illustration of a mobile device.

FIG. 2 is an illustration of a mobile device 232 in accordance with an embodiment of the current invention. In some embodiments, software for sampling, monitoring and/or analyzing content is stored in a local memory 211. Additionally or alternatively, dedicated hardware and/or parallel hardware may be used to perform content filtering functions. For example, a sampling routine and/or a module 246 (for example a preprocessing module 214) and/or on a separate hardware device for example, a FPGA and ASIC and/or a SOC. Alternatively or additionally, software may run on a main processor 206 of the device 232.

In some embodiments, a module 246 is supplied that in embedded into an active program (e.g. a web browser and/or a social network interface and/or an instant messaging routine). Optionally, scans data accessed by the active programs in real time (e.g. before the program actively uses the data). For example, the module may scan live video data before it is rendered on a display. In some embodiments, the screening will issue a warning when inappropriate content is discovered. For example, when a child is receiving and/or sending possible violent or pornographic material. Optionally, certain systems, programs and/or data may be locked in response to finding inappropriate material until a user password is supplied. For example, this may avoid leaking third parties accessing data and/or recording data against the will of a device owner.

In some embodiments, software for sampling, monitoring and/or analyzing content is stored in a local memory 211 and/or accessed through a local program that is anyway accessing the data. In some embodiments data may be sorted and/or routines may be performed on dedicated hardware and dedicated resources. Optionally, the software may include a sampler/shield routine 220 that samples content (for example images and/or videos) and/or sends data for analysis (for example the data may include the content and/or a portion thereof and/or information about the content. For example, sampler may include instructions that sample content differently based on active and/or background applications, regions of a display and/or regions of storage. The sample may be configured to efficiently screen dangerous content while reducing the requirement for system resources for analysis. Optionally, the software may include a preprocessor 214 that screens content quickly and/or recognizes items that are likely candidates to include undesirable content. Alternatively or additionally, the preprocessor 214 may reduce content for example, to make it easier to analyze. For example, a preprocessor 214 may select frames from a video and/or reduce the image density and/or remove portions of an image before sending it for further analysis. Optionally the software includes a hash function 210 and/or signatures 222 for identifying previously recognized undesirable content and/or for generating signatures for recognition of newly recognized undesirable content. In some embodiments, an AI routine 218 (for example, commercial and/or freely available CNN routines for example routines available from Google, Microsoft, Apple etc. for operating systems 212 such as Android, Windows and/or IOS) is used for recognizing undesired content. Optionally, the routines are pretrained 216. The software and/or data 248 may be periodically updated. Optionally some of the functions and/or data may be stored and/or performed by dedicated hardware. Data 248 and/or applications 244 may be stored on internal memory 211 of a device. Alternatively, some or all of the applications 244 and/or data 248 may be stored on removable media 226 and/or network accessible memory. In some embodiments, user data 224 may include personalized instructions that define how strictly to sample and/or analyze content and/or how many resources to use in the analysis and/or when to send data for further analysis and/or how to act when objectionable content is found and/or what areas of the display, what applications and/or what areas of memory to scan. A hasher 210 (e.g. a hash function) may be used to recognize previously identified undesirable content for example based on a signature 222. Alternatively or additionally, the hasher 210 may derive a signature from content that is recognized as undesirable. Optionally, signatures 222 will be uploaded and/or downloaded to and/or from an external server. For example, signatures of undesirable content found on the user device may be uploaded to the server and/or sent to other devices to help identify the content if it finds its way there (e.g. over the Internet and/or social networks). For example, signatures 222 of undesirable content found on the other devices may be downloaded on to the user device to help identify the content if it finds its way to the user device.

In some embodiments, a device may include a lens 204 and/or an images sensor 202. Optionally, images are processed by a dedicated image processor 208. In some embodiments, the device may include an accelerometer 228 and/or a touch screen 230 and/or a power supply 232 (e.g., a battery) and/or a network adapter 234 and/or a local transceiver 236 (e.g., a Bluetooth transceiver) and/or a wireless transceiver 238 and/or a microphone 240 and/or an antenna 242.

In some embodiments a monitoring application may run on a mobile device to detect undesirable content (for example, violence, pornography, misappropriation of intellectual property etc.). Optionally, the application may be a standard and/or self-contained application. Alternatively or additionally, the application may exist as an add-on (e.g., an SDK add-on) to an existing application (for example a social network and/or messenger application (e.g., Facebook and/or WhatsApp)). Optionally, the application may run on the main processor of the device and/or on a parallel processor (e.g. dedicated hardware).

In some embodiments, software loaded on to a mobile device may include one or more modules 246. For example, a module may be configured to perform a repetitive task efficiently. For example, modules 246 may include a white balance correction module, a gamma correction module, an edge enhancement module, a JPEG compression module, an FFT module, an edge detection module, a pattern extraction module, a Fourier-Mellin module, a texture classifier module, a color histogram module, motion detection module, a feature recognition module, and/or a skin tone detection module (for example to grade a percentage of skin tones in an image).

Figure 3:
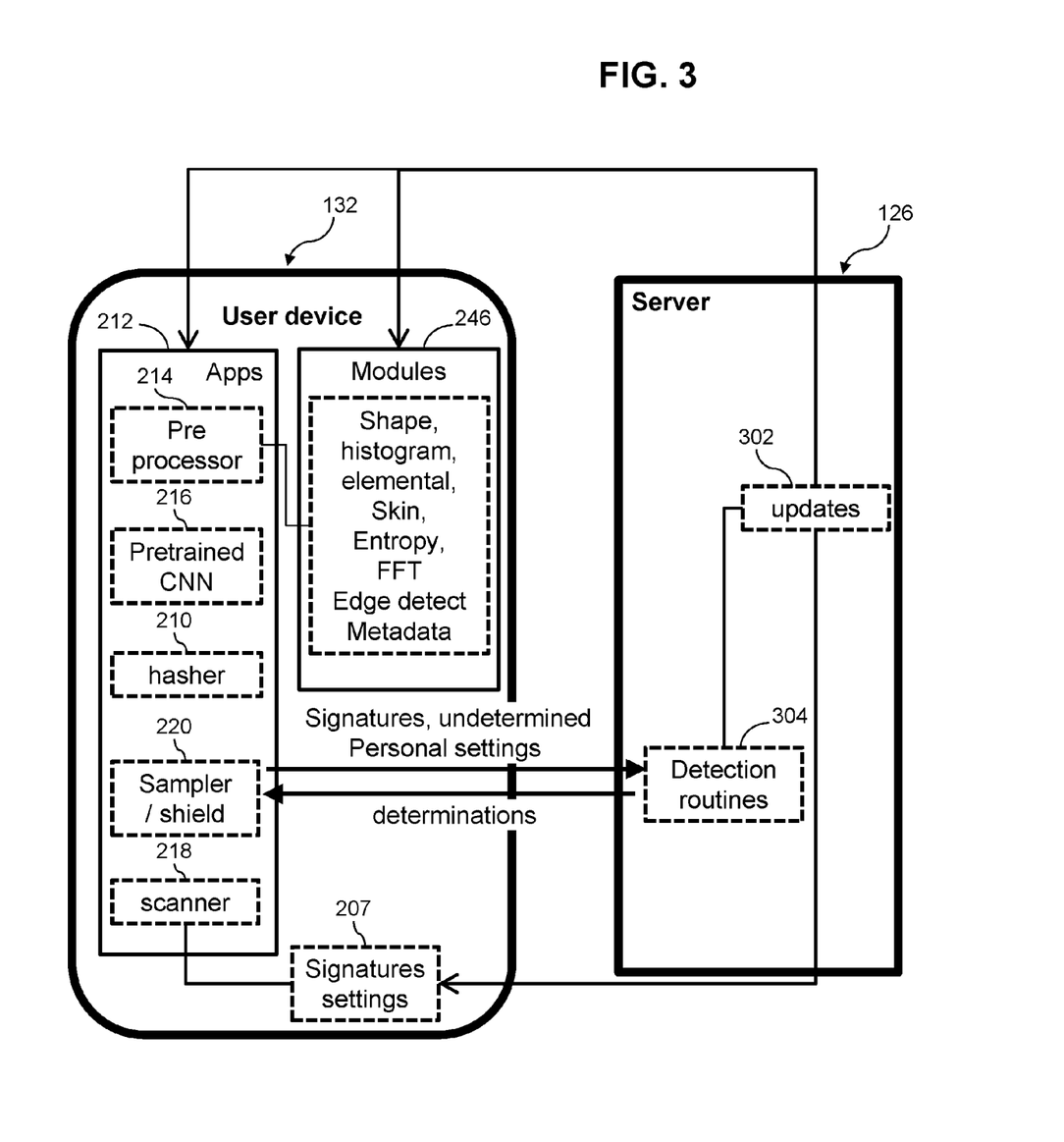
FIG. 3 is an illustration of data flow between a server and a mobile device.

FIG. 3 is an illustration of data flow between a server 126 and a protected device 132 in accordance with an embodiment of the current invention. In some embodiments, a server and/or centralized database will be in communication with a protected device. For example, the server may send software updates 302 and/or signatures of undesirable content. In some, embodiments, when the protected device fails to fully determine the desirability of a piece of content, it may upload the content and/or a portion thereof and/or a derivative thereof to the server for further analysis by a detection routing 304 of the server and/or by another method (e.g., hand classification). In some, embodiments, when the user device produces ambiguous results sending a content item to an external server for further processing. Alternatively or additionally, content that is found undesirable on the protected device may be sent to the server for double checking to make sure that the analysis was correct and/or to derive signatures to send to other devices and/or for archiving and/or for statistical purposes and/or for larger scale analysis for example of sources and/or spreading of content. In some embodiments, a user will change his personal content protection settings 207 (for example using a user interface of the protected device and/or upload those settings 207 to a server. For example, this may allow the user to control the server to screen content arriving to his device from the Internet.

Figure 4:
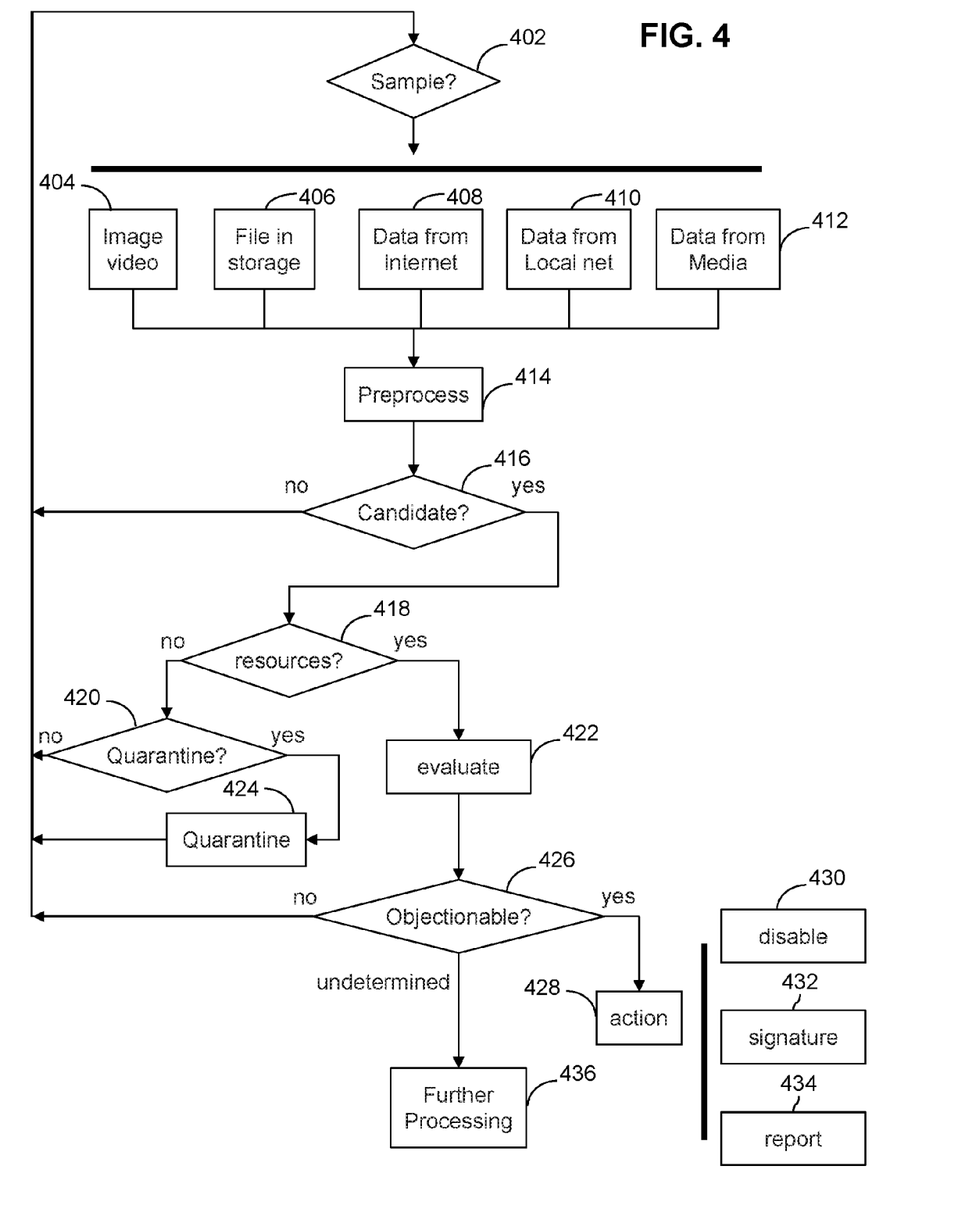
FIG. 4 is a flow chart of a method of monitoring content use in a mobile device.

FIG. 4 is a flow chart of a method of monitoring content use in a mobile device 402 in accordance with an embodiment of the current invention. In some embodiments, content accessed by applications, content coming from local storage 406, an external network 408, content on removable media and/or images 404 captured by a sensor 412 (e.g. camera) and/or transmitted over a local communication medium 410 (e.g. Bluetooth and/or a hard-wired communication port) may be filtered.

If something looks wrong in the data (e.g. appears to include undesired content) a notification may be sent to the local device (e.g. informing the user and/or blocking the content and/or stopping the offending application) and/or to a remote device (for example, a server tracking content of a large number of such devices) and/or content may be blocked, quarantined and/or erased.

In embodiments various strategies may be employed to facilitate scanning of media with limited computing power. In some embodiments, parallel processing may be used over multiple devices and/or parallel local resources. For example, preprocessing and/or final analysis of media may be split between a side processor (e.g. a dedicated processor) and/or the main processor of the device. For example, a preprocessing step 414 may make a coarse examination and/or eliminate frames/images that are not candidates 416 for further evaluation (for example, the coarse examination may use a preprocessor routine while the further evaluation my use AI e.g. a CNN routine). For example, images unlikely to hold unique objectionable content may be free from further analysis and/or may not be candidates 416 for further evaluation. For example, this may reduce the computational burden of compared to a full analysis of the entire sample. For example, the preprocessing may include elemental image processing, simple filtering, skin tone detection, computing a General Classification Function (GCF) for example an Edge Histogram Distribution (EHD), comparison of scalar and/or vector quantities may facilitate quick elimination of redundant images and/or low quality images and/or images that are unlikely to have undesirable content. Meta data may also be used in preprocessing to set a sampling rate and/or low resource prefilter. For example. GPS data may be used to determine if a picture was taken in a location likely to include objectionable content.

In some embodiments, a method of local content filtering may be configured to reduce the amount of data transferred over a network or within the device (for example over an internal data bus and/or a memory controller). Optionally, functions, such as preprocessing and/or AI analysis may be done locally on a user device. For example, an image may not be transferred to a server for further analysis unless it has been recognized as undesirable content and/or the local machine failed to positively determine the presence of undesirable content (for example, an image with suspected but unconfirmed undesirable content may be sent for further processing for example by a server).

In some embodiments, when data, for example an image is evaluated 422 and positively identified as objectionable 426 various actions 428 may be taken for example, disabling 430 the content (e.g., locking the file and/or making a change therein), computing and/or storing a signature 432 for the content (e.g., to make it easier to detect in the future, optionally the signature will be shared to help protect other users as well) and/or reporting 434 the presence of the content to the user of the device and/or another person and/or another device. For example, a signature (e.g., a hash function and/or hash value) may be derived and/or sent to other devices for example to facilitate recognition of the content without requiring full analysis and/or without requiring transferring of the offending image over a network to another machine. Optionally the objectionable content may be disabled 420 (e.g. deleted and/or quarantined). Alternatively or additionally, objectional content may be uploaded to a server. In some embodiments, various actions of sampling and/or scanning are performed in real time (e.g. before and/or while the content is accessed). Optionally, certain functions (for example uploading content to a server, scanning and/or analysis) may be performed off-line (e.g., in the background and/or at times when resources are available). In some cases, when suspicious content is found, it may be quarantined 424 at a time of low system resources 418 and/or later evaluated 436 when more resources are available. Additionally or alternatively, the rate of sampling may be adjusted due to the availability of system resource 418 (for example battery power, memory, spare processing power). Optionally the content monitoring system may self update when new content is detected and/or updates of the content monitoring system may be including with other updates of the device, for example, operating systems updates and/or updates of other components of the monitoring application. For example, training updates may be sent to a CNN routine with updates of routing.

Figure 5:
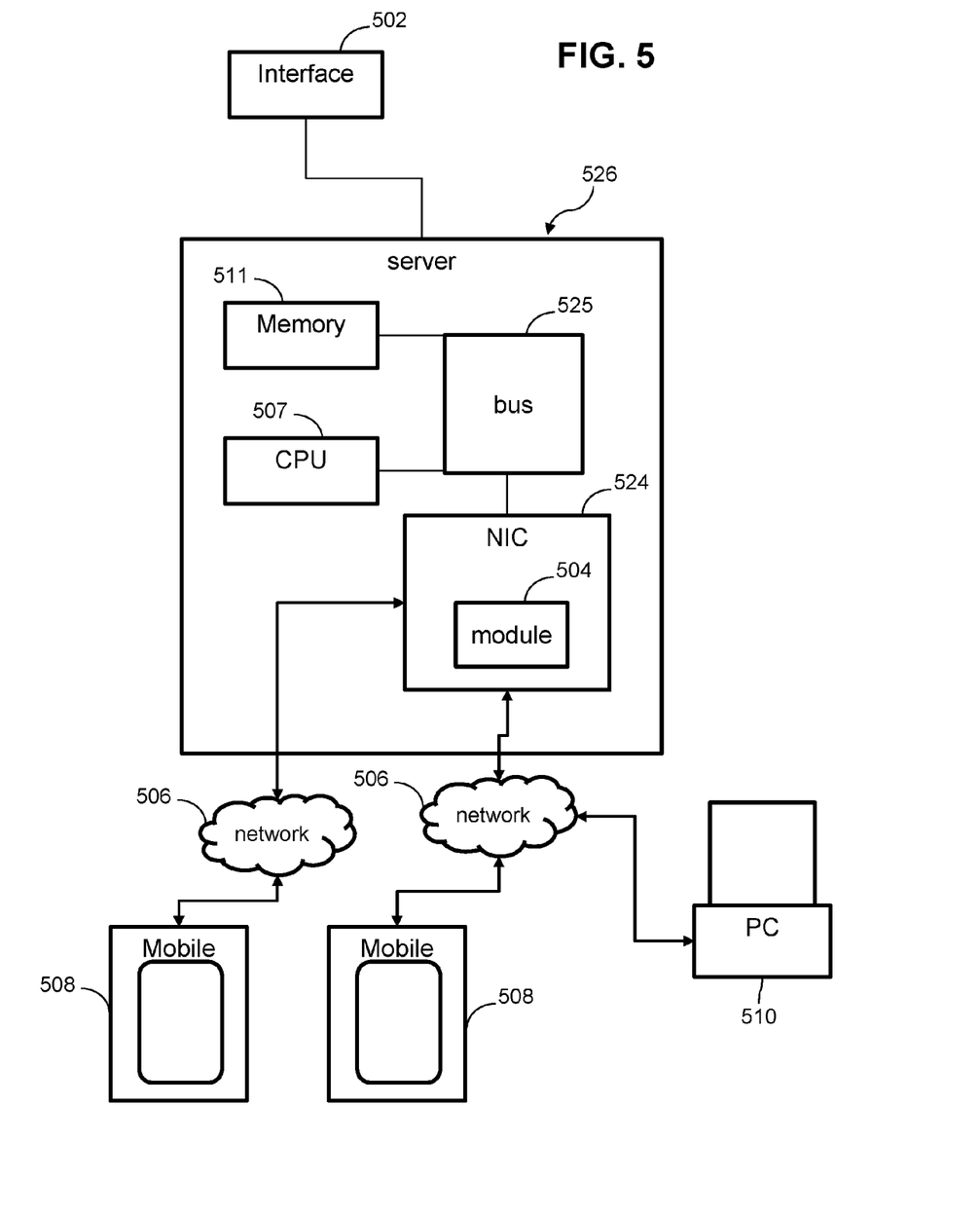
FIG. 5 is a block diagram of a server.

FIG. 5 is a block diagram of a server in accordance with an embodiment of the current invention. In some embodiments an interface 502 is connected to a server 526 which is in turn connect to one or more networks 506. The server 526 includes a Network Interface Card (NIC) 524 with internal content filtering capabilities. For example, including content filtering on a NIC 524 may facilitate a network server preventing cyber abuse of one or more kinds and/or reduce the amount of data that must be transferred within the server between the NIC 524 and the main processor 507 and/or memory 511. For example, the NIC 524 may include internal processing capabilities and/or memory and/or other functions. Optionally, the processing capabilities of the NIC 524 include preprocessing steps. For example, preprocessing may include elemental image processing, simple filtering, skin tone detection, a General Classification Function (GCF) for example an Edge Histogram Distribution (EHD), comparison of scalar and/or vector quantities may facilitate quick elimination of redundant images and/or low quality images and/or images that are unlikely to have undesirable content. Meta data may also be used in preprocessing to set a sampling rate and/or low resource prefilter. Optionally, the preprocessing may remain fixed and/or may not be updated during the lifetime of the device 132 and/or may require minimal updating (for example, the NIC 524 may include a FPGA based content filtering module 504). Alternatively, the NIC 524 may be designed for updating (for example based on an ASIC and/or SOC). Optionally the NIC will include AI capabilities for example for more advanced differentiation discernment of an undesirable content. In some embodiments, content that the internal processing of the NIC 524 determines represents undesirable content and/or content that the internal processing of the NIC cannot fully classify is sent to the main processor of the server for more exhaustive filtering and/or to an external site 510. Alternatively or additionally, content that the internal processing of the NIC 524 determines to represent undesirable content and/or content that the internal processing of the NIC 524 cannot fully classify is quarantined and/or marked and/or blocked and/or deleted. For example, the NIC 524 may include a hash function to recognize signatures of known undesirable materials and/or to mark materials found to have undesirable content and/or suspected of containing undesirable content. Optionally, the system includes a data bus 525, for example to facilitate data transfer between components.

In embodiments various strategies may be employed to facilitate scanning of images with limited computing power. In some embodiments, parallel processing may be used over multiple devices 508. For example, a video may have been distributed to multiple users (e.g. over a social network). Optionally, a server 526 may divide scanning of the video between the devices 508 of different users who received the video. For example, one device may analyze one portion of a video while another device analyzes another portion. For example, one device may analyze a certain frame (e.g. one or more key frames) while the other device analyzes another frame.

It is expected that during the life of a patent maturing from this application many relevant new technologies, artificial intelligence methodologies, computer user interfaces, image capture devices, viewing devices, low power computing devices, personal computing devices etc. will be developed and the scope of the terms for design elements, analysis routines, user devices is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which arc, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of local content filtering for a device comprising:
    taking a sample of media from at least one of a local memory, a data stream from a network and a data stream from local sensor;
    preprocessing the sample using a local processor and locally stored software to determine if the sample is a likely candidate to include objectionable content;
    in response to said sample being found to be a likely candidate perform at least one of quarantining the sample, marking the media, sending the sample to a remote processor for further analysis, analyzing the sample using an artificial intelligence routine running on a local processor and analyzing the sample using an artificial intelligence routine running on said local processor.

2. The method of claim 1, wherein said marking includes computing a hash value.

3. The method of claim 1, wherein said preprocessing is performed by a dedicated processor.

4. The method of claim 3, wherein said dedicated processor includes at least one of an ASIC (Application Specific Integrated Circuit), FPGA (Field-programmable gate arrays) or SoC (System-on-a-Chip).

5. The method of claim 1, wherein said preprocessing is performed by a processor native to a Network Interface Card (NIC).

6. The method of claim 1, wherein said preprocessing is performed by a processor native to a memory controller.

7. The method of claim 1, wherein said taking a sample is in real time between a time the media is accessed and a time the media is rendered.

8. The method of claim 1, further comprising checking a resource availability on the device and performing the analyzing when there are at least a minimum free resource and not performing said analyzing when there are less than said minimum free resources.

9. The method of claim 1, wherein said preprocessing includes at least one of white balance correction, a gamma correction, an edge enhancement, image resolution adjustment, an FFT, edge detection, pattern extraction, texture classification, a color histogram, motion detection, feature recognition, entropy measuring, signature detection and skin tone recognition.

10. The method of claim 1, further including sending a content item to an external server for further processing when said analyzing produces ambiguous results.

11. The method of claim 1, further including sending a content item to an external server when said content is determined to be objectionable.

12. The method of claim 1, wherein said analyzing is performed on a part of the content and wherein another device performs analyzing on another portion of the content.

13. The method of claim 1, wherein said preprocessing and said analyzing are performed by an application running on under at least one operating system selected from Android, windows and IOS.

14. The method of claim 1, wherein said preprocessing is performed by a pretrained routine.

15. The method of claim 1, wherein the sampling includes sampling content more heavily based on at least one of active or background applications, regions of a display, regions of storage, type of application or source of the content, particularly social networks, search results, instant messaging and entertainment media.

16. The method of claim 1, wherein the software includes a hash function or signatures for identifying previously recognized undesirable content.

17. The method of claim 1, wherein the software includes a hash function or signatures for generating signatures for recognition of newly recognized undesirable content.

18. The method of claim 1, further comprising personalized processing including personalized definitions of at least one of how strictly to sample and analyze content, how many resources to use in the analysis, and how to act when objectionable content is identified.

19. The method of claim 1, wherein the method is performed by a self-contained application or an add-on to an existing application.

20. The method of claim 19, wherein the application is self-updating when new content is detected or updates of said application are including with updates of the device or the existing application.

21. The method of claim 20, further comprising preprocessing the content with at least one of using meta data to set a sampling rate and a low resource prefilter.

22. The method of claim 1, further comprising preprocessing the content with a prefilter that uses low computational cost methodologies to eliminate images with a low likelihood of undesirable content.

* * * * *